United States Patent [19]

Sullivan et al.

[11] Patent Number: 5,298,558

[45] Date of Patent: Mar. 29, 1994

[54] ELECTROSTATIC DISSIPATIVE BLENDS OF PVC, POLYETHERAMIDES AND AN IMPACT MODIFIER

[75] Inventors: Francis R. Sullivan, Cleveland Heights; Elaine A. Mertzel, Rocky River; Craig L. Shoemaker, Avon, all of Ohio

[73] Assignee: The Geon Company, Independence, Ohio

[21] Appl. No.: 888,927

[22] Filed: Jun. 2, 1992

Related U.S. Application Data

[63] Continuation-in-part of Ser. No. 723,701, Jun. 25, 1991, abandoned.

[51] Int. Cl.$^5$ .................... C08L 27/06; C08L 67/02; C08L 71/02; B32B 1/08
[52] U.S. Cl. .................................. 525/66; 525/92; 525/167; 525/430; 524/910; 428/36.6
[58] Field of Search .................. 525/92, 167, 430, 66; 524/910; 428/36.6

[56] References Cited

U.S. PATENT DOCUMENTS

| | | | |
|---|---|---|---|
| 3,428,710 | 7/1965 | Daumiller et al. | 260/857 |
| 3,522,329 | 2/1968 | Okazaki et al. | 260/857 |
| 3,632,666 | 1/1972 | Okazaki et al. | 525/192 |
| 3,810,956 | 5/1974 | Kimura et al. | 260/857 |
| 3,839,245 | 10/1974 | Schlossman et al. | 260/18 N |
| 4,331,786 | 9/1980 | Foy et al. | 525/408 |
| 5,023,036 | 6/1991 | Lee et al. | 525/187 |

FOREIGN PATENT DOCUMENTS

| | | |
|---|---|---|
| 0303489 | 2/1989 | European Pat. Off. . |
| 2592388 | 7/1987 | France ................ 525/167 |
| 022947 | 1/1989 | Japan . |

*Primary Examiner*—James J. Seidleck
*Assistant Examiner*—Thomas Hamilton, III
*Attorney, Agent, or Firm*—Miles B. Dearth

[57] ABSTRACT

The present invention relates to electrostatic dissipative impact modified polymeric compositions comprising an effective amount of a chain extended block copolymer, polyvinyl halide and no more than 10 weight parts of a polymeric impact modifier per 100 weight parts of polyvinyl chloride. The chain extended block copolymer is formed from reacting a di-functional polyether with a chain extender which is a condensate selected from the group consisting of polyundecanolactam, polydodecanolactam, poly(11-aminoundecanoic acid) and (12-aminododecanoic acid). The compounds further comprise a heat distortion modifier which does not interfere with ESD properties and is selected from the group consisting of styrene-acrylonitrile copolymer, alpha methyl styrene-styrene-acrylonitrile terpolymer, a polymer of alpha methyl styrene-styrene-N-cyclohexyl maleimide, N-phenylmaleimide, imidized polymethyl methacrylate, post-chlorinated polyvinyl chloride, styrene-maleic anhydride polymer, imidized styrene-maleic anhydride polymer, acrylic-imide copolymer, acrylonitrile-methylmethacrylate copolymer, acrylonitrile-acrylate-polybutadiene graft copolymer, alpha methyl styrene-methylmethacrylate-acrylonitrile terpolymer, alpha-methyl styrene-styrene-methylmethacrylate terpolymer, alpha methyl styrene-methylmethacrylate copolymer, alpha methyl styrene-acrylonitrile copolymer, alpha methyl styrene-methylmethacrylate graft copolymer on polyacrylate rubber, polycarbonate, and brominated polycarbonate.

14 Claims, No Drawings

ELECTROSTATIC DISSIPATIVE BLENDS OF PVC, POLYETHERAMIDES AND AN IMPACT MODIFIER

This is a continuation-in-part of U.S. patent applic. Ser. No. 07/723,701 filed Jun. 25, 1991, now abandoned.

FIELD OF THE INVENTION

This invention relates to improved electrostatic dissipating compounds based on polyvinyl halide in combination with chain extended polyether polymers as high molecular weight polymeric material. These chain extended polymers additives are stable at high processing temperatures and do not cause blooming in the finished product. The present invention also relates to extruded and molded plastic articles which are formed from the polymeric composition containing the chain extended polymer additives.

BACKGROUND OF THE INVENTION

The formation and retention of charges of static electricity on the surface of most plastics is well known. Plastic materials have a significant tendency to accumulate static electrical charges due to low electrical conductivity. The presence of static electrical charges on sheets of thermoplastic film, for example, can cause the sheets to adhere to one another thus making their separation for further processing more difficult. Moreover, the presence of static electrical charges causes dust to adhere to items packaged in a plastic bag, for example, which may negate any sales appeal. Static build up in containers for microprocessors and photographic film presents problems as well as in environments containing explosive dust or fumes.

The increasing complexity and sensitivity of microelectronic devices makes the control of static discharge of particular concern to the electronic industry. Even a low voltage discharge can cause severe damage to sensitive devices. The need to control static charge buildup and dissipation often requires the total assembly environment to be constructed of partially conductive materials. It also may require electrostatic protective packages, tote boxes, casings, and covers be made from conductive polymeric materials to store, ship, protect, or support electrical devices and equipment.

The prevention of the buildup of static electrical charges which accumulate on plastics during manufacturing or use has been prevented by the use of various electrostatic dissipative (ESD) materials. These materials can be applied as a coating which may be sprayed or dip coated on the article after manufacture although this method usually results in a temporary solution. Alternatively these materials can be incorporated into the polymer during processing thereby providing a greater measure of permanence. However, the incorporation of low molecular weight electrostatic dissipative materials (anti-static agents) into the various polymers has its own limitations. For example, during the hot temperatures required during conventional processing many of the antistatic agents cannot withstand high temperatures and are damaged or destroyed, thereby being rendered useless with respect to their ESD properties. Also, many of the higher molecular weight ESD agents are not miscible with the base polymers employed, and if the refractive indices differ by more than about 0.02, there can be a substantial opacity in the composition. In an immiscible polymer blend where the particle size of a dispersed phase is greater than 0.1 micron, the smaller the difference in the refractive indices between the additives and the base polymer the greater the clarity of the article made from the mixture.

A large number of anti-static agents are also either cationic or anionic. These tend to cause the degradation of plastics, particularly PVC, and result in discoloration or loss of physical properties. Low molecular weight anti-static agents possess undesirable lubricating properties and are difficult to incorporate into the polymer. Incorporation of the low molecular weight anti-static agents into the polymers often will reduce the moldability of the base plastic because the antistatic agents can move to the surface of the plastic during processing and frequently deposit a coating on the surface, producing excessive marring or poor surface finish on the articles of manufacture. In severe cases, the surface of the article of manufacture becomes quite oily or marbleized. Additionally, the low molecular weight ESD agents tend to lack permanence and lose their ESD capability due to evaporation. There can be undesirable odors, stress cracking or crazing can develop on the surface of an article in contact with the article of manufacture.

One of the known lower molecular weight antistatic agents is a homopolymer or copolymer oligomer of ethylene oxide. Generally, use of the lower molecular weight polymers of ethylene oxide or polyethers as antistatic agents are limited by the above-mentioned problems relative to lubricity, surface problems, or less effective ESD properties. Further, these low molecular weight polymers can be easily extracted or abraded from the base polymer thereby relinquishing any electrostatic dissipative properties. Polyetheresteramide block copolymers (PEA) have higher molecular weight and thus would have better permanence of properties, however with respect to polyvinyl chloride polymers, there are problems pertaining to compatibility and impact strength. With some polyetheresteramides there are incidences of lack of uniform dispersion within the PVC matrix. There are problems relating to the reduction of moduli and impact strength of mixtures of PEA and polyvinyl chloride.

The high polymer electrostatic dissipative agents in general derived from polymers of ethylene oxide or a derivative thereof like propylene oxide, epichlorohydrin, glycidyl ethers and the like having high haze values and thus lack transparency desired for some end uses. This is especially true for combinations of PVC and certain polyetheresteramides.

Antistatic properties for thermoplastic polyvinyl chloride resins which are suitable for injection molding has increased commercial importance, however these resins have inherent rheological characteristics which limit the number of ESD additives which can be successfully melt mixed to form a uniform blend of commercially acceptable appearance and physical properties. This invention is directed to a solution for this problem.

In the modification of vinyl thermoplastics such as polyvinyl chloride, there must be sufficient mechanical compatibility between the antistatic polymer and the vinyl polymer in order that the blend will have sufficient tensile strength and impact resistance, however in order for achieving the desired degree of ESD performance a discrete dispersed phase of ESD agent is necessary. This dictates that a certain degree of incompatibility must exist between the matrix polymer phase polyvinyl chloride, and the dispersed phase ESD agent which results in poor impact strength. It has been found that conventional impact modifiers in combination with polyetheresteramide and polyvinyl chloride interfere with static decay rate and volume resistivity. This invention is aimed at a solution to this problem.

Certain polyetheresteramide block copolymers having acceptable static dissipative properties are non-rigid owing to the proportion of polyether segment in the block copolymer. These non-rigid materials may be blendable with rigid PVC thermoplastic resins but there is presented a problem of reduction in moduli and heat distortion temperature which limits the commercial applications for such a compound. This invention addresses a solution to this problem.

SUMMARY OF THE INVENTION

The present invention relates to electrostatic dissipative polymeric compositions comprising an effective amount of the chain extended polyether polyamide block polymer uniformly dispersed in a matrix polymer of injection molding grade polyvinyl chloride which has an inherent viscosity of from 0.2 to 0.6. The preferred chain extended polyethers are selected from the group consisting of the reaction product of di-terminal amine functional polyamide co-condensed with a di-terminal carboxylic polyether; a di-terminal carboxylic polyamide and di-terminal amine functional polyether and a di-terminal carboxylic polyamide co-condensed with di-terminal hydroxyl polyether. The preferred polyamide segment is present at 45 to 55 weight percent of the block copolymer and is a condensate selected from the group consisting of polyundecanolactam, polydodecanolactam, poly(11-aminoundecanoic acid) and (12-aminododecanoic acid). The chain extended block copolymer is effective in providing dissipative properties such that 99% of an initial 5000 volt charge is dissipated in less than 2.0 seconds. The block copolymer is effective at from 10 parts to 100 parts, preferably 10 to 20 parts by weight per 100 parts by weight of the matrix polymer of polyvinyl chloride.

The invention also concerns ESD compounds of PEA in combination with extrusion grade polyvinyl chloride having Inherent viscosity of from 0.65 to 1.1. The preferred PEA in combination with extrusion grade PVC is selected from the group consisting of block copolymer of poly (11-aminoundecanoic acid) and polyethylene glycol, poly (12-aminododecanoic acid)-block-polyethylene glycol, poly (11-aminoundecanoic acid)-block-polyethylene glycol, poly(undecanolactam)-block-polyethylene glycol, poly (ε-caprolactam-adipic acid)-block-polyethylene glycol.

The invention is also directed to an impact strength improvement for a static dissipative blend of polyvinyl chloride, particularly injection molding grade, and PEA, providing a balance of impact strength, static decay rate and volume resistivity. The improvement comprises the addition of no more than 10 weight parts, per 100 weight parts of matrix polymer, of a polymeric impact modifier selected from the group consisting of graft copolymers of styrene-acrylonitrile-polydiene, styrene-methylmethacrylate-polydiene; styrene-acrylonitrile-methylmethacrylate-polydiene; and polyacrylate impact modifiers including mixtures. Addition of more than 10 parts by weight per 100 parts PVC of polymeric impact modifiers results in loss of acceptable ESD properties.

The invention also pertains to heat distortion modifiers which are miscible with polyvinyl chloride and yield higher heat distortion temperature (HDT) yet do not hinder ESD performance. However the presence of an HDT modifier necessitates impact modification. ESD, HDT and impact strength are achieved in a combination of limited amounts of polymeric impact modifier, thermoplastic PVC matrix polymer, PEA, and a heat distortion modifier selected from the group consisting of styrene-acrylonitrile copolymer. alpha methyl styrene-styrene-acrylonitrile terpolymer, a polymer of alpha methyl styrene-styrene-N-cyclohexyl maleimide, N-phenylmaleimide, imidized polymethyl methacrylate, post-chlorinated polyvinyl chloride, styrene-maleic anhydride polymer, imidized styrene-maleic anhydride polymer, acrylic-imide copolymer, acrylonitrile-methylmethacrylate copolymer, acrylonitrile-acrylate-polybutadiene graft copolymer, alpha methyl styrene-methylmethacrylate-acrylonitrile terpolymer, alpha-methyl styrene-styrene-methylmethacrylate terpolymer, alpha methyl styrene-methylmethacrylate copolymer, alpha methyl styrene-acrylonitrile copolymer, alpha methyl styrene-methylmethacrylate graft copolymer on polyacrylate rubber, polycarbonate, and brominated polycarbonate.

The invention enables useful articles to be formed using injection molding or extrusion processes for making articles such as films, tubes, paper trays, machine housings, tote bins, floor tiles, photographic film containers, a photocopier components.

DETAILED DESCRIPTION OF THE PREFERRED EMBODIMENTS

The chain extended polymer having electrostatic dissipative properties comprises:

(A) a polyether oligomer having two terminal reactive moieties and an average molecular weight from about 200 to about 20,000 wherein the oligomer is a linear or branched polyoxyalkylene glycol containing 2 to 4 carbons in the oxyalkylene unit. Included in the polyethers are copolymers comprising two or more copolymerizable monomers one of which is a cyclic ether having the formula:

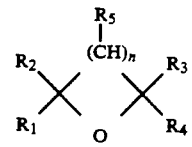

wherein $R_1$, $R_2$, $R_3$, $R_4$, and $R_5$ are independently hydrogen, unsubstituted or substituted alkyl, cycloalkyl, cycloalkenyl, aryl, aralkyl or alkaryl, the substituents are $OR_6$, $SR_6$, CN or halogens, $R_6$ and $R_7$ are independently hydrogen, alkyl, cycloalkyl, cycloalkenyl, aryl, aralkyl, alkaryl, or carboxyl, the reactive moieties are OH, $NH_2$, or $NHR_6$, n is 0, 1, 2, or 4. The preferred ethers are derived from ethylene oxide or ethylene glycol. Other examples of cyclic ether monomers are propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide; (B) optionally up to 35 moles of a modifier for each mole of polyether and (C) a chain extender, the preferred extender selected from the group consisting of polyesters, di-carboxylic polyamide and di-carboxylic copolyamide.

The polyethers can have an average molecular weight from about 200 to about 20,000 and preferably from about 500 to about 5000, as determined by end group analysis. The reaction of the polyether with a chain extender will furnish a chain extended polymer having melt indices from 0.05 to 110 grams per ten minutes. The preferred melt index range of the chain extended polymer will be from about 1.0 to 65 grams/10 minutes. The melt index is determined according to ASTM D-1238 Procedure A at a barrel temperature of 190° C. and an 8700 gram piston load.

In an alternative embodiment the polyether is end capped with ethylene oxide or ethylene imine thereby providing an oligomer which will have two primary moieties.

The alkyl groups can have from 1 to 6 carbon atoms, be straight or branched chain and may be unsubstituted or substituted. The alkenyl groups can have from 1 to 6 carbon atoms, be straight or branched chain, have 1 or two double bonds and be unsubstituted or substituted.

The cycloalkyl and cycloalkenyl groups can have from 3 to 8 ring carbon atoms and from 1 to 3 rings. The cycloalkenyl groups can have 1 or 2 double bonds.

The aryl groups can have from 6 to 10 ring carbon atoms and one or two rings.

Useful polyethers are linear polymers having the general formula:

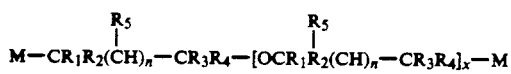

wherein $X+1$ is the number of repeating ether units, each M is a reactive moiety, n is 0,1,2, or 4 and $R_1$, $R_2$, $R_3$, $R_4$ and $R_5$ are as defined hereinabove. The most common M is the OH group. For the subject invention $X+1$ is at least 4 and between 4 and about 500. On a molecular weight basis, the useful range of polyether oligomers have an average molecular weight from about 200 to 20,000 and preferably from about 500 to 5000 and most preferably from 1000 to 3000. The percent of polyether by weight of the block copolymer is greater than 25%, preferably greater than 35% and most preferably from 45% to 55% by weight. The polyethers chain extended with a di-terminal carboxylic polyamide have preferred hydroxyl terminal chain ends, and are derived from polymers of the aforementioned linear glycols, and alternatively branched glycols. Exemplary polyethers are hydroxyl terminal polyoxyethylene glycol, polyoxypropylene glycol, polyoxytetramethylene glycol, and polyethers derived from the cyclic ethers outlined above. Commercially available from Dow Chemical Inc., exemplary polyethylene glycols (PEG) are designated as polyethylene glycol 600, polyethylene glycol 1450, and polyethylene glycol 4000. copolymerizable monomers.

For example linear aliphatic polyamides are prepared by conventional means, e.g. polycondensation of an organic diacid and diamine reacted in the presence of an excess of an organic diacid. Polyamide molecular weight can be controlled by the level of excess diacid present during condensation. Polyamides designated 6, 6-6, 6-9, 6-10, 6-12 and 9-6 represent condensation reactions of ε-caprolactam, hexamethylene diamine and adipic acid, hexamethylene diamine and azaelic acid, hexamethylene diamine and sebacic acid, hexamethylene diamine and 1,12-dodecanoic acid, and of nonamethylene diamine and adipic acid, respectively. Chain terminating diacids are preferably $C_4$ to $C_{20}$ aliphatic dicarboxylic acids. Exemplary dicarboxylic acids are succinic acid, adipic acid, sebacic acid, undecanedioic acid and dodecane-dioic acid. Polyether chain extended with di-carboxylic polyamide based on 11-aminoundecanoic acid or 12-aminododecanoic acid can be combined to form a uniform compound with injection molding grade PVC having I.V. less than 0.6, however a PEA comprising ethylene oxide -caprolactam cannot.

Preferably equimolar amounts of diacidic polyamide and polyether are co-polycondensed under inert atmosphere in the presence of a catalyst. Suitable catalysts are metal tetraalkoxides. Examples of these are $Zr(OC_2H_5)_4$, $Ti(OC_4H_9)_4$, and tetralkylorthotitanate such as tetrabutylorthotitanate in alkaline alcoholate dispersion. The reaction is carried out preferably in the fluid state under stirring and high at temperatures between 100° and 300° C. The reaction times vary under different conditions and with different reactants from 10 minutes to 10 hours. The following examples are illustrative of ESD compositions of PVC and polyetheresteramide.

The chain extended polymer is effective as a static dissipative in the range of from about 3 parts to 100 parts by weight per 100 weight parts of matrix PVC polymer or polymer blend. In the most preferred form the PEA is used at from 10 parts to 20 parts of the chain extended polymer per 100 parts by weight of the polyvinyl halide polymer or polymer blend.

In applications for thermoplastic molded or extruded articles, particularly thin films of thickness 1.5 mm of less, the most preferred embodiment of the invention provides improved translucence. It has been found that altering the weight percent of polyether in the chain extended polymer can cause the refractive index of the polymer to be changed. The preferred percent of polyether in the chain extended polymer based on polyethylene glycol is from 45% to 55% for translucent polyvinyl chloride-PEA compound.

The preferred extender is selected from the group consisting of a di-terminal functional condensate selected from the group consisting of polyundecanolactam, polydodecanolactam, poly(11-aminoundecanoic acid) and (12-aminododecanoic acid).

The compositions have the following ESD properties:

(a) surface resistivity of less than about $1 \times 10^{14}$ Ohms/sq, as measured according to ASTM D-257; or (b) volume resistivity of less than about $1 \times 10^{14}$ Ohms-cm, as measured according to ASTM D-257. Clarity can be defined as follows:

(I) a percent light transmission greater than 50% for 20 mil film as measured according to ASTM D-1003-61; and (II) a percent haze value less than 60% for a 20 mil film as measured using a Hunterlab model D-54P-5 spectrophotometer or equivalent.

The spectrophotometer is calibrated with haze standards having nominal values of 5 and 10, Part No. HG-1214, as supplied by Gardner Laboratory Division, Bethesda, Md.

In a preferred embodiment the surface resistivity will be less than about $2 \times 10^{12}$ Ohms/sq, and the volume resistivity will be less than about $1 \times 10^{12}$ Ohms-cm. In the most preferred embodiment the surface resistivity of composition will be $1 \times 10^{12}$ Ohms/sq or less, and the volume resistivity $1 \times 10^{12}$ Ohms-cm or less. The preferred light transmission is greater than 70% for a 20 mil film as measured according to ASTM D-1003-61; and the preferred haze value is less than 30% for a 20 mil film. The most preferred light transmission is greater than 80% for a 20 mil film as measured according to ASTM D-1003-61; and the most preferred haze value is less than 20% for a 20 mil film.

Surface and volume resistivity testing is conducted in accordance with ASTM D257. An adapter compresses an upper electrode and a lower circular electrode encircled with a ringing electrode. A sheet sample (3.5 inches in diameter and ⅛-1/16 inch thick) was placed between the upper and lower electrodes, and a voltage of 500 volts was applied between the electrodes. After 60 seconds, the resistance was recorded using an ohmmeter and converted into surface resistivity in Ohms/square or volume resistivity in Ohms-cm. The static decay test is carried out in accordance with Federal Test Method Standard 101B, Method 4046.1, "Electrostatic Properties of Materials" with a Static Decay Meter, model 406C obtained, from Electro-Tech Systems, Inc. Static decay is a measure of the ability of a material, when grounded, to dissipate a known charge that has been induced on the surface of the material. A sheet sample (3"×6") with ⅛-1/16 inch thickness is placed between clamp electrodes contained in a Faraday cage. A 5,000 volt positive charge is applied to the surface of the specimen and the time in seconds required to dissipate the charge to 500 volts (10% of its initial value) or to 50 volts (1% of its initial value), after a ground is provided, is then measured. This test was run on unconditioned samples and on samples conditioned for 48 hours at 15% relativity humidity (RH).

The matrix polymer as defined herein can be a homopolymer or a copolymer of polyvinyl chloride. Polyvinyl chloride, PVC, as used herein, refers to homopolymers and copolymers of vinyl halides and vinylidene halides and includes post halogenated vinyl halides such as CPVC. Examples of these vinyl halides and vinylidene halides are vinyl chloride, vinyl bromide, vinylidene chloride and the like. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, hydroxyethyl acrylate, and the like; esters of methacrylic acid, such as methyl methacrylate, butyl methacrylate, hydroxyethyl methacrylate, and the like; nitriles, such as acrylonitrile, methacrylonitrile, and the like; acrylamides, such as methyl acrylamide, N-methylol acrylamide, N-butoxy methylacrylamide, and the like; vinyl ethers, such as ethyl vinyl ether, chloroethyl vinyl ether, and the like; the vinyl ketones; styrene and styrene derivatives, such as $\alpha$-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 20% by weight, based on the weight of the monomer mixtures. Some copolymers have a tendency to decrease the clarity of the article and therefor the comonomer amount in the copolymer should be minimized. The most preferred vinyl polymer, or resin, is polyvinyl chloride (PVC) homopolymer produced by the mass or suspension polymerization process and the invention, for simplicity and convenience, will be described in connection therewith, it being understood that this merely intended in an illustrative sense and not limitative. Articles of this invention may be made from resins produced by the suspension, mass, emulsion or solution processes.

At times, the polyether oligomer can be blended with a glycol or a diamine modifier before reaction with the chain extender. The modifier may be any diol (i.e., glycol) or combination of diols, containing 2 to 10 carbon atoms, such as ethylene glycol, 1,3-propanediol, propylene glycol, 1,4-butanediol, 1,3-butanediol, 1,5-pentanediol, 1,6-hexanediol, diethylene glycol, 1,4-cyclohexane dimethanol, neopentyl glycol, hydroquinone bis(2-hydroxyethyl) ether, or any aliphatic or aromatic molecule containing two reactive hydroxyl groups. The preferred glycol modifier is 1,4-butanediol.

Further, the diamine modifiers can be any diamine or combination of diamines, containing 0 or 2 to 10 carbon atoms, such as hydrazine, ethylene diamine, 1,3-diamino-propane, aminoaniline and the like.

In general, for each mole of polyether oligomer employed, the amount of chain extender employed will be about 1.0 moles. If a glycol or diamine modifier is employed, the sum of the moles of the modifier plus the moles of polyether oligomer will be at a ratio of about 1.0 mole for each 1.0 mole of chain extender.

Hydroxyl or amino terminated polyols described above can be blended with a glycol or diamine modifier before the blend is reacted with the chain extender or the polyol and the modifier can be brought to the reaction zone simultaneously. If desired, the polyol can be reacted with a diisocyanate, then reacted with the modifier. Stabilizers such as antioxidants can be added prior to the reaction or during the reaction.

The amount of glycol or diamine modifier is generally from about 0 to about 35 moles and desirably from about 0 to about 20 moles for every mole of low molecular weight polyether oligomer. Generally, the number of moles of diisocyanate per total of the number of moles of the low molecular weight polyether oligomer plus the number of moles of modifier is from about 0.95 to about 1.06 and preferably from about 0.97 to about 1.03.

In an alternative procedure two or more of the polyether oligomers can be reacted with a chain extender to furnish an oligomer dimer or trimer. These dimers or trimers can then be chain extended under similar conditions to form the high molecular weight polymer. This procedure can be used to produce a high molecular weight chain extended polymer with varying chain extender groups.

Conventional chain extenders are molecules having two functional groups (reactive sites) which will react with the reactive moieties of the polyethers.

The reactive moieties typically occur at the ends of the polyether oligomers as a result of routine synthesis, however the reactive moieties can be located at locations other than the ends. Generally, these are hydroxyl groups, although this group may be substituted by any of several other reactive groups which can then react with another function group on the chain extender. The reactive moieties most useful for the present invention are OH, NH$_2$ and NHR$_6$. In a preferred form the reactive moieties are OH, NH$_2$ or NHR$_6$ and are on primary carbon atoms. The most preferred reactive moiety is OH.

Some examples of chain extenders are organic diacids, preferably carboxylic polyamide, acid derivatives, such as diesters, diacyl halides, and the like, diisocyanates or any other difunctional molecule or oligomer which can react with the polyether. Some examples of useful diacid derivatives are diethyl or dimethyl esters of carbonic acid, oxalic acid, malonic acid, succinic acid, glutaric acid, adipic acid, pimelic acid, sebacic acid, phthalic acid, and the like. Acyl halides which are effective in this invention are acyl chlorides of carbonic acid, oxalic acid, malonic acid, succinic acid, glutaric acid, adipic acid, pimelic acid, sebacic acid, phthalic acid and the like.

Any conventional diisocyanate can be used, either aliphatic or aromatic. Suitable diisocyanates include, for example, 1,4-diisocyanatobenzene (PPDI), 4,4'-methylenebis(phenyl isocyanate) (MDI), 4,4'-methylenebis(3-methoxy phenyl isocyanate), 1,5-naphthalene diisocyanate (NDI), toluene diisocyanate (TDI), m-xylene diisocyanate (XDI), 1,4-cyclohexyl diisocyanate (CHDI), 1,10-diisocyanatonaphthylene, and 4,4'-methylenebis(cyclohexyl isocyanate) (H$_{12}$ MDI). The most preferred diisocyanate is MDI.

The subject invention contemplates the process for preparing an electrostatic dissipative polymeric compounds comprising the steps of adding to a matrix polymer an effective amount of the chain extended polymer and mixing the polymers to produce the electrostatic dissipative composition.

The compositions of the present invention are useful for a variety of applications. Some examples are tubes, paper trays, floor tiles, machine housings, tote bins, and polymeric films.

The impact modifiers include acrylonitrile butadiene styrene terpolymers (ABS) such as available from GE Plastics Inc. under the Blendex trademark, and methacrylate butadiene styrene polymer (MBS). Other impact modifiers are disclosed in *Plastics compounding*, Nov./Dec., 1983: "Update: Impact Modifiers for Rigid PVC," by Mary C. McMurrer. Impact modifiers generally contain a rubbery core component including polybutadienes jointly graft-copolymerized with styrene and methyl methacrylate (MBS). Paraloid® KM-653, BTA-733 from Rohm and Haas, or Kanegafuchi B-56 and B-22KO MBS types; polybutadienes jointly graft-copolymerized with acrylonitrile and styrene (ABS), low rubber types are preferred; nitrile rubber blended with SAN; polybutadienes jointly graft-copolymerized with acrylonitrile and alphamethyl styrene; ethylene-propylene-diene rubber, referred herein as EPDM graft-copolymerized with vinyl chloride, EPDMs jointly graft-copolymerized with styrene and acrylonitrile, polybutadienes graft-copolymerized with styrene, methyl methacrylate and acrylonitrile (MABS); acrylate impact modifiers such as those believed to be polybutyl acrylate graft-copolymerized with methyl methacrylate, (KM®-323B, KM®-330 Trademark of Rohm and Haas); polybutyl acrylate jointly graft-copolymerized with methyl methacrylate and styrene, polybutyl acrylate graft polymerized with acrylonitrile and styrene (Blendex® 975,977, or 979-Trademark of GE Plastics, Inc.); butyl rubbers graft-copolymerized with vinyl chloride, block copolymers of styrene-butadiene-styrene, radial block copolymers of styrene and butadiene, styrene-butadiene rubbers, vulcanizable acrylate rubbers, EPDMs and the like. Chlorinated polyethylene (CPE) is an exemplary impact modifier. Percent chlorine content preferably ranges from about 25% to 40%. CPE containing 25% and 36% are commercially available from Dow Chemical, Inc. In the present invention a preferred impact modifier used alone or preferably in combination with a graft copolymer, consists of a polyvinyl chloride polymer which has an Inherent viscosity which is at least 0.2 I.V. units higher than the I.V. of the matrix polymer. For example in a preferred embodiment, matrix PVC with I.V. from 0.2 to 0.6 is 100 weight parts, 3 to 10 weight parts of PVC having I.V. from 0.8 to 1.2, and 2 to 10 parts of polymeric ABS, MBS, MABS or polyacrylate are combined.

Exemplary heat distortion improving agents include styrene-acrylonitrile copolymer, alpha methyl styrene-styrene-acrylonitrile terpolymer available from GE plastics, Inc. as Blendex® 586, a polymer of alpha methyl styrene-styrene-N-cyclohexyl maleimide, N-phenylmaleimide, imidized polymethyl methacrylate, post-chlorinated polyvinyl chloride, styrene-maleic anhydride polymer, imidized styrene-maleic anhydride polymer, acrylic-imide copolymer, acrylonitrile-methylmethacrylate copolymer, acrylonitrile-acrylate-polybutadiene graft copolymer, alpha methyl styrene-methylmethacrylate-acrylonitrile terpolymer, alpha methyl styrene-styrene-methylmethacrylate terpolymer, alpha methyl styrene-methylmethacrylate copolymer, alpha methyl styrene-styrene-acrylonitrile terpolymer (AMS/S/AN), alpha methyl styrene-acrylonitrile copolymer, alpha methyl styrene-methylmethacrylate graft copolymer on polyacrylate rubber, polycarbonate, and brominated polycarbonate available from Great Lakes Chemical, Inc..

Various conventional additives are suggested for the compounds of the present invention. Thus, heat stabilizers, fillers, pigments, colorants, lubricants, fire retardants, antioxidants, UV inhibitors, and processing aids generally employed for use in polymers, can be implemented. Moreover, plasticizers, such as those typically used and known to one skilled in the art can also be utilized. Various fillers include the various clays and calcium carbonate. The pigments include titanium dioxide. The amounts and types of additives, fillers and/or pigments required are well known to those skilled in the art.

EXAMPLES

The invention is illustrated by examples and not intended to be limiting of the scope of the present invention. In conjunction with the general and detailed description above, the examples provide further understanding of the present invention and demonstrate some of the preferred embodiments of the invention. All parts listed are parts by weight.

A blend of polyvinyl chloride having an inherent viscosity of 0.52 with PEA comprising polycondensed caprolactam-adipic acid and polyethylene glycol (PEA-1) was attempted and failed. The melting point of the PEA was 195° C., Vicat softening point was 160° C. and the flexural modulus 16,000 psi. This combination resulted in a non-homogenous mixture and could not be tested. A blend of polyvinyl chloride with inherent viscosity 0.68 and suitable for extrusion was combined with PEA-1 and resulted in a homogenous, intimate mixture. This blend was tested for static decay rate (99% at RH 15%) and volume resistivity following the formula:

| COMPONENT | EXAMPLE | | |
|---|---|---|---|
| | 1 | 2 | 3 |
| PVC (I.V. 0.68) | 100 | 100 | 100 |
| PEA-1 | 5 | 10 | 15 |
| polyacrylate process aid | 4 | 4 | 4 |
| Octyl tin thioglycolate | 3 | 3 | 3 |
| Irganox ® antioxidant | 2 | 2 | 2 |
| CaCO$_3$ | 10 | 10 | 10 |
| stearic acid | 0.5 | 0.5 | 0.5 |
| calcium stearate | 0.2 | 0.2 | 0.2 |
| Static Decay 99% (sec.) | 2.7 | 0.15 | 0.04 |
| surface resist. (50% RH) ($\times 10^{11}$ Ohms/sq.) | 87 | 1.8 | 0.53 |

Thus the compounds above, as extruded articles exhibited excellent ESD properties (decay time less than 2 seconds and surface resistivity less than $10^{12}$ ohms/sq.) when the block copolymer was present at 10 and 15 parts per 100 parts PVC. The preferred I.V. range for PVC suitable for extrusion thus is indicated as ranging from 0.65 to 1.2.

EXAMPLES 4–6

Example 4 is a combination of PVC having an I.V. of 0.52 with a PEA-2 made from co-polycondensed 12-aminododecanoic acid and polyethylene glycol (PEA-2) having a melting point by DSC of 155.6° C., flexural modulus of 13,000 psi, vicat softening point 126° C., and Shore-D hardness of 41.8. This combination resulted in a homogenous intimate mixture which when molded gave excellent surface appearance. Example 5 is a combination of PVC having I.V of 0.68 and PEA-1. Example 6 is a combination of PVC with I.V. 0.68 and PEA-2 for comparison of impact strength improvement of PEA-2 over Example 5 PEA-1.

| COMPONENT | EXAMPLE | | |
|---|---|---|---|
| | 4 | 5 | 6 |
| PVC (I.V. 0.53) | 100 | — | — |
| PVC (I.V. 0.68) | — | 100 | 100 |
| PEA-1 | — | 10 | — |
| PEA-2 | 10 | — | 10 |
| process aid | 6 | 4 | 4 |
| Octyl tin thioglycolate | 3 | 3 | 3 |
| antioxidant | 2 | 2 | 2 |
| CaCO$_3$ | 5 | 10 | 10 |
| stearic acid | 0.25 | 0.5 | 0.5 |
| calcium stearate | 0.5 | 0.2 | 0.2 |
| Static Decay 99% (15% RH in sec.) | 0.51 | 0.24 | 0.30 |
| surface resist. (15% RH) ($\times 10^{11}$ Ohms/sq.) | 20 | 4.0 | 20 |
| volume resist. (15% RH) ($\times 10^{11}$ Ohms/cm.) | 10 | 4.0 | 7.0 |
| IZOD (@ room t. notched) (ft. lb./inch) | 3.5 | 0.91 | 1.2 |

Illustrated above by Example 4, it is shown that a useful compound can be made from PEA-2 based on nylon-12/PEG with a polyvinyl chloride having I.V. less than 0.6 which enables injection molding of a variety of articles. In addition it is shown that the notched IZOD is higher than that of a corresponding PVC having I.V. of 0.68 which is unexpected.

EXAMPLES 7–8

The following examples 7 and 8 illustrate the interference of impact modifiers on ESD properties at levels of 10 parts by weight based on 100 weight parts PVC (phr) while at 5 phr there is attained acceptable static decay rates.

| COMPONENT | EXAMPLE | |
|---|---|---|
| | 7 | 8 |
| PVC (I.V. 0.53) | 100 | 100 |
| PEA-2 | 10 | 10 |
| ABS imp. mod. | 10 | 5 |
| process aid | 3 | 3 |
| Methyl tin stabilizer | 3 | 3 |
| CaCO$_3$ | 5 | 5 |
| calcium stearate | 2.0 | 2.0 |
| montan ester wax | 2.0 | 2.0 |
| Static Decay 99% (15% RH in sec.) | 2.1 | 1.1 |
| IZOD (@ 18° C. notched) (ft. lb./inch) | 13.5 | 0.91 |

ESD comparisons were made between compounds of this blend and a blend of PVC and commercially available ethylene oxide-epichlorohydrin copolymer under the designation EO-EC manufactured by the BFGoodrich Co., Cleveland, Ohio. The EO-EC copolymer exhibits yellowing on long term aging with PVC. The table below illustrates the compounds and properties measured.

TABLE

| | Example Weight Parts | | | |
|---|---|---|---|---|
| | 9 | 10 | 11 | 12 |
| PVC (I.V. = 0.68) | 100 | 100 | 100 | 100 |
| Acrylic Processing Aid | 4 | 4 | 4 | 4 |
| Calcium Carbonate | 10 | 10 | 10 | 10 |
| Antioxidant | 2 | 2 | 2 | 2 |
| Alkyl tin Stabilizer | 3 | 3 | 3 | 3 |
| Lubricants | 0.7 | 0.7 | 0.7 | 0.7 |
| EO-EC copolymer | 22 | — | — | — |
| PEA-1 | — | 22$^x$ | 15$^x$ | 5 |

$^x$UV stabilized

The compositions of Examples 9–12 were fluxed on a Banbury mill set at approximately 193° C. for several minutes until uniformity was reached. The compound temperatures at drop ranged from 182° C. to 187° C. The compounds were processed on a heated 4-roll mill set at approximately 182° C. for several minutes and then cubed. The cubes from each compound were injection molded into test specimens on a Battenfield, Inc. 83 ton injection molder under the following conditions:

| Status | Temp. °C. |
|---|---|
| - rear | 185 |
| - center | 187 |
| - front | 190 |
| - nozzle | 193 |
| mold | 21 |
| inj. melt temp. | 202 |

Injection velocity was controlled at 30% of maximum with compensation. Holding pressure was approximately 1000 psi and back pressure approximately 125 psi. Sample hold time was 6 sec. The following physical properties and ESD performance were obtained from the molded test specimens. Static decay time is reported in seconds to decay from either +5000 or −5000 volt charges on sample specimens after conditioning at 15 and 50 percent relative humidity. Static decay times were taken at the point where 10% of original charge remained and at negligible residual charge voltage (0%).

|  | Examples | | | |
|---|---|---|---|---|
|  | 9 | 10 | 11 | 12 |
| tensile strength (psi) | 4,817 | 5,019 | 5,695 | 6,784 |
| tensile modulus ($\times 10^3$ psi) | 306 | 272 | 328 | 380 |
| flexural strength (psi) | 8,903 | 9,541 | 10,980 | 12,690 |
| flexural modulus ($\times 10^3$ psi) | 320 | 296 | 354 | 435 |
| HDT at 264 psi (°C.) | 68 | 67 | 70 | 66 |
| Static decay time (sec.) at 15% RH | | | | |
| to 10% | ±0.06 | ±0.01 | ±0.01 | ±0.14/−0.15 |
| to 0% | +0.79/−0.35 | ±0.02 | ±0.02 | +1.69/−2.66 |
| at 50% RH | | | | |
| to 10% | ±0.03 | ±0.005** | ±0.006** | ±0.08 |
| to 0% | ±0.27 | ±0.026 | ±0.059 | +2.23/−1.61 |
| Surface Resistivity ($\times 10^{11}$ Ohms/sq) | | | | |
| at 15% RH | 8.1 | 0.353 | 0.976 | — |
| at 50% RH | 12.0 | 0.157 | 0.497 | 87.4 |
| Volume Resistivity ($\times 10^{11}$ Ohms-cm) | | | | |
| at 15% RH | 2.18 | 0.175 | 0.476 | — |
| at 50% RH | 4.66 | 0.097 | 0.707 | — |

**unconditioned

The following examples show that a compound of PVC and PEA can be modified with both an impact modifier and a heat distortion modifier without interfering with ESD properties.

TABLE

|  | Example Weight Parts | | | |
|---|---|---|---|---|
|  | 9 | 10 | 11 | 12 |
| PVC (I.V. = 0.52) | 100 | 100 | 100 | 100 |
| SAN Processing Aid | 3 | 3 | 3 | 3 |
| Calcium Carbonate | 5 | 5 | 5 | 5 |
| AMS/S/AN terpolymer | 0 | 10 | 20 | 30 |
| Methyl tin Stabilizer | 2.5 | 2.5 | 2.5 | 2.5 |
| Calcium stearate | 2 | 2 | 2 | 2 |
| ABS impact modifier | 5 | 5 | 5 | 5 |
| Montan ester wax | 2 | 2 | 2 | 2 |
| Static Decay 99% (15% RH in sec.) | .061 | .064 | .079 | .13 |
| surface resist. (15% RH) ($\times 10^{11}$ Ohms/sq. | 10 | 23 | 11 | 26 |
| Heat Distortion Temp. (°C.) (unannealed, ⅛ in.) | | | | |
| At 264 psi | 64 | 67 | 68 | 70 |
| At 66 psi | 67 | 70 | 72 | 72 |

The above preferred embodiments and examples are given to illustrate the scope and spirit of the present invention. These embodiments and examples will make apparent, to those skilled in the art, other embodiments and examples. These other embodiments and examples are within the contemplation of the present invention.

What is claimed is:

1. An electrostatic dissipative polymeric composition as an impact modified, homogeneous mixture comprising:

100 weight parts of a polyvinyl chloride polymer, said polyvinyl chloride polymer having an inherent viscosity of from 0.2 to 0.6, from about 10 parts to about 20 parts by weight of a co-condensate chain extended polymer said chain extended polymer comprising:

(A) from 45% to 55% of a polyether having two reactive moieties which will condense with (C), and having an average molecular weight from about 200 to about 20,000

(B) from about 0 moles to about 35 moles of a modifier for each mole of polyether;

(C) from 55% to 45% of a chain extender comprising a terminal reactive polyamide or co-polyamide selected from the group consisting of polyundecanolactam, polydodecanolactam, poly(11-aminoundecanoic acid) and (12-aminododecanoic acid); and from 1 to 10 weight parts of a polymeric impact modifier.

2. The electrostatic dissipative composition of claim 1 wherein the modifier is selected from the group consisting of a diol and a diamine.

3. The electrostatic dissipative composition of claim 1 wherein the polyether is a copolymer of ethylene oxide or polyethylene glycol and at least one other copolymerizable monomer selected from the group consisting of propylene oxide, 1,2-butylene oxide, epichlorohydrin, allyl glycidyl ether, n-butyl glycidyl ether, glycidyl acrylate, glycidyl methacrylate, 2-ethylhexyl glycidyl ether, tetrahydrofuran, or styrene oxide.

4. The composition of claim 1 wherein said polymeric impact modifier is selected from the group consisting of polybutadienes graft-copolymerized with styrene and methyl methacrylate, polybutadienes graft-copolymerized with acrylonitrile and styrene, nitrile rubber blended with styrene acrylonitrile copolymer, polybutadienes graft-copolymerized with acrylonitrile and alpha-methyl styrene, ethylene-propylene-diene rubber graft with vinyl chloride, EPDMs jointly graft-copolymerized with styrene and acrylonitrile, polybutadienes graft-copolymerized with styrene, methyl methacrylate and acrylonitrile, polyacrylate, polybutyl acrylate graft-copolymerized with methyl methacrylate and styrene, polybutyl acrylate graft polymerized with acrylonitrile and styrene, polybutyl acrylate graft-copolymerized with vinyl chloride, block copolymers of styrene-butadiene-styrene, radial block copolymers of styrene and butadiene, styrene-butadiene rubbers, and Chlorinated polyethylene.

5. The composition of claim 1 in the form of an article which is selected from the group consisting of a film, tube, paper tray, machine housing, tote bin and floor tile, a photographic film container, and a photocopier component.

6. A process for preparing a homogeneous, impact modified, electrostatic dissipative polymeric compound comprising the steps of:

(I) combining from about 10 parts to about 20 parts by weight of a chain extended polymer with polyvinyl chloride and from 1 to 10 weight parts of a polymeric impact modifier, said chain extended polymer imparting electrostatic dissipative properties, said chain extended polymer comprising:

(A) 45% to 55% of a lower molecular weight polyether having two reactive moieties and an average molecular weight from about 200 to about 10,000 wherein the polyether is a homopolymer or a copolymer of a cyclic ether monomer having the formula:

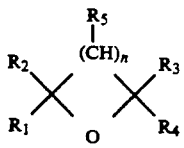

wherein $R_1$, $R_2$, $R_3$, $R_4$, and $R_5$ are independently hydrogen, unsubstituted or substituted alkyl, alkenyl, cycloalkyl, cycloalkenyl, aryl, aralkyl or alkaryl, the substituents are $OR_6$, $SR_6$, $CN$, $COOR_6$, or halogens;

$R_6$ and $R_7$ are independently hydrogen, alkyl, alkenyl, cycloalkyl, cycloalkenyl, aryl, aralkyl, alkaryl, or carboxyl; the reactive moieties are $OH$, $NH_2$, or $NHR_6$; and n is 0, 1, 2, or 4;

(B) from 55% to 45% by weight of a chain extender selected from the group consisting of di-terminal functional: polyundecanolactam, polydodecanolactam, poly(11-aminoundecanoic acid) and (12-aminododecanoic acid); and (II) mixing at from 300° F. to 375° F. temperatures said polyvinyl chloride, impact modifier and chain extended polymer to produce the homogeneous, impact modified, electrostatic dissipative composition.

7. The process of claim 6 wherein the amount of chain extended polymer is from about 10 parts to about 20 parts by weight and polyvinyl chloride is 100 weight parts.

8. The process of claim 7 further comprising the step of combining up to 10 weight parts of a polymeric impact modifier selected from the group consisting of polybutadienes jointly graft-copolymerized with styrene and methyl methacrylate, polybutadienes graft-copolymerized with acrylonitrile and styrene, nitrile rubber blended with styrene acrylonitrile copolymer, polybutadienes graft-copolymerized with acrylonitrile and alpha-methyl styrene, ethylene-propylene-diene rubber, graft with vinyl chloride, EPDMs jointly graft-copolymerized with styrene and acrylonitrile, polybutadienes graft-copolymerized with styrene, methyl methacrylate and acrylonitrile, polyacrylate, polybutyl acrylate graft-copolymerized with methyl methacrylate and styrene, polybutyl acrylate graft polymerized with acrylonitrile and styrene, polybutyl acrylate graft-copolymerized with vinyl chloride, block copolymers of styrene-butadiene-styrene, radial block copolymers of styrene and butadiene, styrene-butadiene rubbers, and Chlorinated polyethylene, said composition having the following electrical properties:

(a) surface resistivity of $1 \times 10^{12}$ Ohms/sq. or less as measured according to ASTM D-257; or (b) volume resistivity of $1 \times 10^{12}$ Ohms-cm or less as measured according to ASTM D-257; and, having the following optical properties:

(I) a percent light transmission greater than 50% for 20 mil film; and (II) a percent haze value less than 60% for a 20 mil film.

9. An electrostatic dissipative polymeric composition as an impact modified, homogeneous mixture comprising:

100 weight parts of a polyvinyl chloride polymer, said polyvinyl chloride polymer having an inherent viscosity of from 0.65 to 1.2, from about 10 parts to about 20 parts by weight of a co-condensate chain extended polymer said chain extended polymer comprising:

(A) from 45% to 55% of a polyether having two reactive moieties which will condense with (C), and having an average molecular weight from about 200 to about 20,000

(B) from about 0 moles to about 35 moles of a modifier for each mole of polyether;

(C) from 55% to 45% of a chain extender comprising a terminal reactive polyamide or co-polyamide selected from the group consisting of caprolactum, and adipic acid, and hexamethylene diamine and adipic acid, and from 1 to 10 weight parts of a polymeric impact modifier.

10. The polymeric composition of claim 9 wherein said polyvinyl chloride is a homopolymer having an inherent viscosity of about 0.68.

11. An extruded article made from the composition of claim 11 wherein said article exhibits a static decay time less than 2 seconds, and a surface resistivity less than $10^{12}$ ohms/sq, and wherein said composition contains from 10 to 15 weight parts of said chain extended polymer per 100 weight parts of polyvinyl chloride.

12. An electrostatic dissipative composition comprising 100 parts polyvinyl chloride, and from 2 to 10 parts impact modifier and a chain extended polymer comprising copolycondensed 12-aminododecanoic acid and polyethylene glycol, wherein said polyvinyl chloride polymer has an inherent viscosity of less than 0.6.

13. The composition of claim 12 wherein said impact modifier is selected from the group consisting of ABS, MABS and acrylic impact modifiers.

14. The composition of claim 12 wherein said impact modifier is present at about 5 weight parts per 100 weight parts polyvinyl chloride.

* * * * *